United States Patent Office 3,415,870
Patented Dec. 10, 1968

3,415,870
PURIFICATION OF ETHYLENICALLY UNSATURATED SULFONATED MONOMERS
Donald A. Kangas and David P. Sheetz, Midland, Mich., assignors to The Dow Chemical Company, Midland, Mich., a corporation of Delaware
Filed Mar. 3, 1965, Ser. No. 436,779
7 Claims. (Cl. 260—486)

ABSTRACT OF THE DISCLOSURE

Polymerizable ethylenically unsaturated sulfonated monomers which contain as an impurity polymers of the monomer are purified by treating an aqueous solution of the polymer monomer mixture with a cationic adsorbent having a plurality of cationic groups, causing a separate phase of the adsorbent and polymer to form, followed by recovering the aqueous solution of monomer.

---

Figure 1:
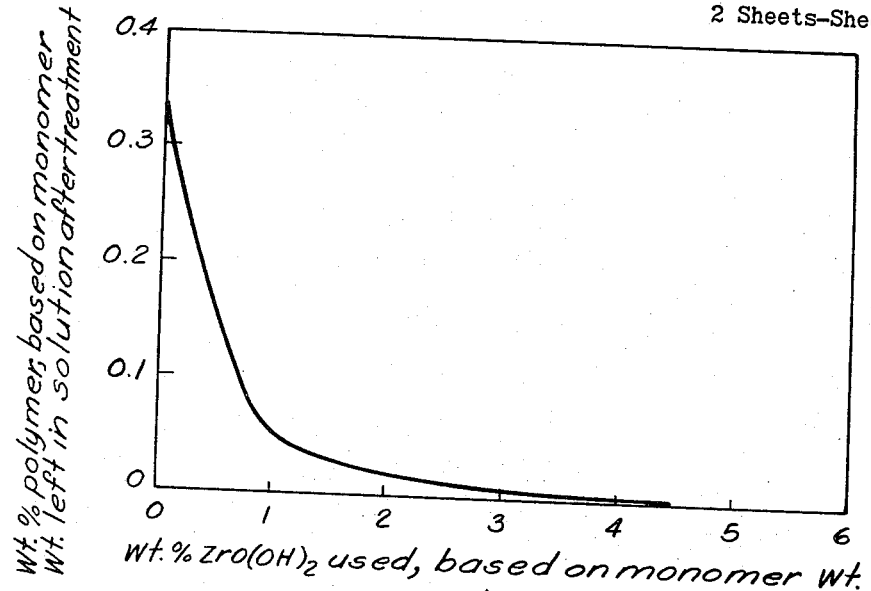

This invention relates to a method for the purification of sulfonated monomers and particularly to the purification of polymerizable ethylenically unsaturated monomers.

Sulfonated monomers having ethylenic unsaturation (i.e., vinyl and vinylidene) through which polymerization can propagate are useful for many purposes, but primarily they are employed in the preparation of homopolymers and copolymers with other functional monomers. These polymers provide special advantages for use in such applications as ion exchange resins, emulsifiers, thickeners, detergents, as dye receptive additives in synthetic fibers, etc. The monomers are equally well suited for copolymerization with other functional monomers for the preparation of polymers especially tailored for numerous requirements. For example, the polymerizable sulfonated monomers can be polymerized, in many instances, with monomers conventionally used to prepare fiber-forming polymers to provide functional properties such as improved dyeability to the fibers prepared therefrom.

It has been observed that oftentimes when ethylenically unsaturated sulfonated monomers are polymerized to form homopolymers and copolymers the results are unexplainably erratic, that is, the rate of polymerization and degree of polymerization varies from one batch of polymerization reaction to another. The change in rate of polymerization may not be of significant importance when homopolymers of the monomers are being formed, save the extra time involved if a decrease is observed, however, the desired molecular weight range or degree of polymerization of the polymer may be extremely important. Moreover, when copolymers are being made the rate of polymerization is also necessarily closely controlled from one polymerization to another if consistent polymer products are to be obtained. Otherwise, varying amounts of each of the copolymerizing monomers is likely to wind up in the polymer chain resulting in polymers of different compositions and properties.

The unpredictable nature of many of these sulfonated monomers is thought to be caused by impurities entrained in the monomer charge. These impurities may be carried over from the synthesis of the monomers or subsequent handling and treating processes. For example, in the preparation, manipulation and storage of the ethylenically unsaturated sulfonate monomers formation of a certain amount (frequently from 0.1 to about 5%) of polymer in the monomer almost invariably occurs. Also, often due to the presence of oxygen the unintended polymer that does occur may contain peroxy groups, or, if polymerization inhibitors are employed in the monomer charge, the unintended polymer may contain inhibitor moieties. It can be seen that, as a result, the presence of such unintended polymer is usually not beneficial even though the monomer charge is subsequently polymerized. Impurities may also be introduced when part of a monomer charge is obtained from a prior polymerization medium. This often occurs when a recycle polymerization system is employed where a polymerization is not carried to complete conversion, the polymer being separated from the medium and additional monomer added and other polymerization begun. Thus, some residual polymer and other constituents such as catalyst residues and the like are usually present and often interfere with the polymerization reaction.

Various means have been used to purify the sulfonated monomers in order to purify the monomer and to rectify the erratic polymerization including recrystallization, solvent extraction, activated charcoal treatments, chromatography and distillation. For the most part these methods are not satisfactory from the standpoint of being ineffective to solve the problem or too tedious, time consuming and costly.

It is the chief object and primary concern of the present invention to provide a relatively simple, expedient and efficient means for purifying polymerizable ethylenically unsaturated sulfonated monomers by a means that produces uniform and consistent results and provides an excellent yield of purified monomer charge.

The foregoing and additional objects and cognate benefits and advantages, which will be made apparent by the ensuing description and specification and the accompanying drawing (which will be discussed in connection with some of the examples to follow), are accomplished by practice of the present invention which comprises the sequential steps of (1) dispersing throughout an aqueous solution of a polymerizable ethylenically unsaturated sulfonated monomer and polymers of the monomer a cationic absorbent having a plurality of cationic groups reactive with the anionic groups of the polymer; (2) maintaining the dispersion for a time sufficient for the polymer and the cationic adsorbent to form a separate phase from said aqueous solution of monomer; and (3) isolating the separate phase from the aqueous solution.

If the sulfonated monomer that is to be treated is in the form of a sulfonic acid, generally, better results are achieved if the sulfonic acid is first converted to a salt form by neutralizing the sulfonic acid with an inorganic basic salt. Although not essential to the invention, purifying the salt form of the sulfonated monomers is a preferred embodiment of the invention, otherwise, part of the sulfonic acid may be converted to an unwanted salt by the purifying constituents during the purification treatment. If desired, the sulfonate monomer salt can be converted back to the acid form either before or during subsequent processing.

Depending on the quantity of polmer in the solution and the ease of isolating or separating the separate phase as, for example, by filtration, the treatment of the solution with the cationic adsorbent may be repeated. Or, if desirable or deemed necessary, after the treatment with the cationic adsorbent, the solution of sulfonated monomer can be further purified by other treatments. The necessity of this will generally depend on the kind and quantity of the impurities in the solution. Thus, for example, in addition to polymer or low molecular weight polymer the solution may contain other impurities including spent catalyst and decomposition products and other impurities and color bodies picked up during synthesis and other processing. In this connection, it is usually found to be the case that removal of color bodies from the solution is best attained after treatment of the solution with the cationic adsorbent. This can be advantageously accomplished by treating the solution with such microporous materials as activated charcoal. On the other hand, treatment of the solution with such activated material prior to treating the solution with the cationic adsorbent has little effect or at best is very inefficient for the removal of color bodies. This is apparently so for reasons that the polymeric impurities adsorb on the pore openings of the microporous material and tend to plug or block the pores retarding diffusion of the smaller color bodies and other low molecular weight impurities. Additionally, treatment of the solution with a microporous material prior to treatment with a cationic adsorbent is for all practical purposes ineffective for the removal of polymeric impurities.

It is surprising that the present treatment is so selective and leaves the sulfonated monomer in solution essentially unaffected while causing precipitation of or otherwise removing by absorption or some other phenomena polymeric and other impurities. Thus, by way of example, it has been observed that when a solution of sulfoethylmethacrylate containing minor amounts of polymerized sulfoethylmethacrylate, methacrylic acid, polymethacrylic acid and peroxides of organic sulfonic acids is treated in accordance with the invention, these latter materials are selectively removed while leaving in solution an excellent yield of essentially pure sulfoethylmethacrylate.

Any of a wide variety of polymerizable ethylenically unsaturated sulfonated monomers can be treated for purification thereof with the herein described method. Advantageously, those sulfonated monomers that have relatively high water solubility are purified by this method, although those having lesser solubilities can also be treated. The concentration of the solution with respect to the monomer being treated is not critical. For obvious reasons concentrations above the saturation concentration are to be avoided since any monomer that is precipitated will be removed and generally lost with the precipitated impurities.

Exemplary of the sulfonated monomers that can be purified with the present method include sulfonated alkenyl aromatic monomers of the structural formula

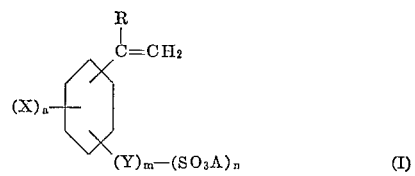

wherein R is selected from the group consisting of hydrogen, and methyl; X is individually selected from the group consisting of hydrogen, chlorine, bromine, and alkyl radicals containing from 1 to 8 carbon atoms; Y is selected from the group consisting of bivalent and trivalent hydrocarbon radicals containing 1 to 4 carbon atoms; A is selected from the group consisting of hydrogen, alkali metals, and alkaline earths (Ca, Ba, Sr) or the transition metals (Zn, Cu, Ni, Co, Fe, Mn, Cr, V, Ti); $a$ is an integer from 1 to 4; $m$ has a numerical value in whole units of 0 to 1; $n$ is an integer from 1 to 2; sulfonated olefin monomers of the structural formula:

$$CH_2=CZ-(Y)_m-(SO_3A)_n \quad (II)$$

wherein Z is selected from the group consisting of hydrogen, chlorine, bromine, carboxyl radicals, aryl radicals containing from 6 to about 12 carbon atoms, and alkyl radicals containing from 1 to 8 carbon atoms, and Y, A, $m$ and $n$ are as defined above for monomer (I); and sulfonated acrylate and methacrylate monomers of the structural formula:

$$CH_2=CR-CO-Q-Y-(SO_3A)_n \quad (III)$$

wherein Q is selected from the group consisting of oxygen (—O—) and amide nitrogen (—NR—); and R, Y, A, and $n$ are as defined above for monomer (I).

The sulfonated aromatic and the sulfonated olefin monomers have been described and are involved in U.S. Patent No. 2,527,300, and the sulfonated acrylate and methacrylate monomers in U.S. 3,024,221. Typical of the various sulfonated monomers that may be employed with benefit in the practice of the present invention are those included in the following tabulations, grouped according to general type:

TABLE I

Typical sulfonated aromatic monomers of Formula I para-styrene sulfonic acid
ortho-styrene sulfonic acid
para-isopropenyl benzene sulfonic acid
para-vinyl-alpha-toluene sulfonic acid
para-isopropenyl-alpha-toluene sulfonic acid
sodium para-styrene sulfonate
potassium ortho-styrene sulfonate
2-chloro-4-vinylbenzene sulfonic acid
2-bromo-4-isopropenyl benzene sulfonic acid
3-vinyl toluene 6-sulfonic acid, sodium salt
3-ethyl-4-vinyl-benzene sulfonic acid
2,3-dicholoro-4-vinyl benzene sulfonic acid
1,3-disulfo-2-(4-vinyl benzyl) propane

TABLE 2

Typical sulfonated olefin monomers of the Formula II ethylene sulfonic acid
sodium ethylene sulfonate
potassium ethylene sulfonate
1-propene 2-sulfonic acid
1-propene 3-sulfonic acid
1-butylene 3-sulfonic acid
2-methyl 1-propene 3-sulfonic acid

TABLE 3

Typical sulfoalkylacrylates of the Formula III 2-sulfoethylacrylate
2-sulfoethylmethacrylate, sodium salt
2-sulfoethylmethacrylate, potassium salt
3-sulfopropylacrylate, sodium salt
1,3-disulfo 2-propanol ester of methacrylic acid

TABLE 4

Typical acryloyl taurines of the Formula III

N-acryloyl taurine
N-acryloyl taurine, sodium salt
N-methacryloyl taurine, potassium salt
N-acryloyl-aminopropane sulfonic acid
N-methacryloyl-aminopropane sulfonic acid, sodium salt The foregoing and associated sulfonic compounds can be prepared initially as salts or if not they can be, and preferably are, converted to salts before being purified by the present method. This is advantageously accomplished by adding the dry monomer to an aqueous solution or slurry of a chosen neutralizing salt.

Advantageously and beneficially, a monomer solution of not greater than about 25-30 weight percent monomer is treated. If a higher concentration is employed there may be incomplete separation of precipitation of polymeric material and impurities and filtration may be difficult and time consuming when attempts are made to remove the adsorbed agglomerate.

The cationic adsorbents having a plurality of cationic groups that are employed in the practice of the present invention can be generally described as (1) water insoluble cationic colloidally dispersible inorganic solids such as certain hydrous metal oxides such as hydrous $ZrO_2(ZrO(OH)_2)$, $Al_2O_3(Al(OH)_3)$, $Fe_2O_3(Fe(OH)_3)$, etc.; (2) colloidally dispersible organic solids such as cationic polymer emulsions containing polymerically combined cationic groups such as emulsions of a water-soluble salt of a mono-hydric amino alcohol ester of an α-methylene mono-carboxylic acid (e.g., 2-aminoethyl acrylate hydrochloride) copolymerized with a water-insoluble ethylenically unsaturated monomer (e.g., styrene) and others, such as those described in U.S. 3,108,979; and (3) water soluble polycationic electrolytes such as polyalkyleneimines, e.g., polyethyleneimine, poly-2-aminoethyl methacrylate·HCl, poly N,N - dimethyl - 2 - aminoethyl methacrylate·HCl, starch containing chemically bound dimethyl aminoethyl ether groups, etc.

The efficiency of the cationic adsorbent will vary somewhat from one adsorbent to another as well as with the particular sulfonated monomer that is being treated. However, provided with the present teaching and the preference of the artisan and the materials at hand, an adequate choice of the cationic adsorbent can be made.

The cationic adsorbent is preferably added as an aqueous colloidal dispersion, emulsion or solution according to the dictates of adsorbent and the sulfonated monomer solution. This mode facilitates dissolution of the adsorbent in the monomer solution and assures better mixing and contacting of the adsorbent with the polymeric and other impurities. Any dispersion concentration of the cationic adsorbent can be added to the monomer solution. Generally, a relatively concentrated dispersion or solution is used to avoid unnecessary dilution of the monomer solution since this will usually increase filtration or separation time.

It can be said generally that any amount of the chosen type of cationic adsorbent that is mixed with the sulfonated monomer solution will provide some purification. The required amount will depend primarily on the amount of impurities in the monomer solution and the degree of purity desired, the latter of which will normally depend on the end use to which the monomer is to be put. The necessary amount of the cationic adsorbent can be readily determined by treating a sample of the monomer solution with a known amount of the cationic adsorbent. Or, if the amount of impurities present in the monomer solution is first ascertained a calibrated amount of the cationic adsorbent can then be added.

It is generally desirable that an excess, on a weight basis, of the cationic adsorbent over the polymeric impurities be employed. An excess does no harm as long as the removal of the excess can be efficiently accomplished. In this connection, however, a distinction must be drawn between the water insoluble or colloidally dispersible cationic adsorbents and the water soluble cationic adsorbents (or as otherwise described polycationic electrolytes). It is, of course, to be realized that, strictly speaking, it may be a misnomer to refer to the water soluble species as a cationic adsorbent since this term tends to indicate adsorption at an interface, and initially, with such, there is no interface present. However, for present purposes, and as to be construed in the specification and claims hereof, the term "cationic adsorbent" includes both the water insoluble and the water soluble varieties of cationic adsorbents described and contemplated herein. Thus, with respect to an excess, an excess of the water insoluble adsorbents usually presents no problems regards removal because they are easily filtered or removed from the treated solution and an excess may be even beneficial in that an easier filterable product is provided. On the other hand, when an excess of a water soluble cationic adsorbent is used over that necessary to complex with the polymeric impurity, that excess frequently winds up itself as a polymeric impurity. Advantageously and beneficially, an equivalent amount of the water soluble cationic adsorbent is used, i.e., that amount that will result in a zero or neutral charge on the agglomerate or complex of the water soluble adsorbent and the polymeric impurity. Ordinarily, the insolubilizing or the formation of a filterable precipitate does not occur until the charge on the polymeric impurity has been partially neutralized, and this insolubilizing increases until a zero or neutral charge is reached. When an excess of the water soluble adsorbent is used it may then itself be a polymeric impurity or take on enough of the anionic polymeric impurity so that the agglomerate experiences a charge reversal (i.e., becomes negatively charged and so that it partially goes back into solution). Of course, even so, some and frequently considerable filterable agglomerate forms even though a zero or neutral charge is not achieved. Generally, between about 0.5 and 10 weight percent, based on monomer weight, of the cationic adsorbent (water soluble or water insoluble) is advantageously employed.

If the amount of impurities are high, it may be desirable or necessary to treat the solution two or more times rather than attempting to effect the purification in a single treatment. This will depend in large extent on the ease of filtration of the solution after the treating reactions.

The purification treatment is conveniently conducted at ambient temperature. Higher or lower temperatures can be used but are not of particular advantage. As a matter of fact, elevated temperatures are best avoided lest premature polymerization of the sulfonated monomer occur.

Any conventional means can be used to separate the adsorbed or precipitated impurities and the cationic adsorbent from the monomer solution such as filtration and centrifugation. Conventional vacuum filtration techniques are adequate for the purpose and any conventional inert filter aid may be added to facilitate filtration. For that matter, a filter aid may be most beneficial when the product of the reaction between the impurity and the cationic adsorbent is in a very finely dispersed form. Usually it is preferable to use a filter aid which in itself has an inherent negative (anionic) surface charge and a slight excess of the cationic adsorbent. This will enhance adsorption of the cationic adsorbent impurity complex onto the surface of the filter aid and thereby facilitate removal by filtration. Diatomaceous earths are effective filtering aids.

The yields of the purified monomer solution that are obtained, based on the original unpurified solution, will vary depending on the purity of the starting solution, the care exercised in performing the operations, and the number of washings given the precipitated material. If the precipitated material is rather voluminous it may carry with it relatively large quantities of liquid. However, the present treatment is excellently well suited for obtaining high yields of exceptionally well purified sulfonated monomers.

The following examples will serve to further illustrate the invention wherein, unless otherwise specified, all parts and percentages are by weight.

EXAMPLE 1

An aqueous solution of sulfoethylmethacrylate, sodium salt, SEM$^-$Na$^+$, 15%, containing 0.2% diphenyl phenylenediamine (DPPD) as a polymerization inhibitor, was treated with 4.3% hydrous ZrO(OH)$_2$ by mixing the following materials:

Aqueous SEM$^-$Na$^+$, pH 3 (unsaturation 1.552 millimoles/ml.) _____ ml__ 272
Deionized water _____ ml__ 185
4.22% ZrO(OH)$_2$ on wet Filter-cel (diatomaceous earth) (37% solids) _____ g__ 250

The mixture was stirred by end over end rotation at room temperature overnight in a brown bottle from which air had been purged with a stream of N$_2$. Filter-cel and hydrous ZrO(OH)$_2$ containing adsorbed polymer was removed by filtration on a medium sintered glass funnel. The light green filtrate was further treated with 3% Darco G–60 powder, an activated carbon, based on monomer by again stirring overnight by end over end rotation in a brown bottle from which air had been purged with a stream of N$_2$. The filtrate through a medium sintered glass funnel was essentially colorless. Polymer concentration and color of the SEM$^-$Na$^+$ solution after each treatment are listed in Table V.

TABLE V

| Treatment | Unsaturation, mmoles/ml. | Carboxylic acid, mmoles/ml. | Optical density $D_{390}$ | Percent polymer based on monomer wt. |
|---|---|---|---|---|
| Initial solution | 0.656 | 0.040 | 0.90 | 0.33 |
| 4.3% ZrO(OH)₂ | 0.642 | 0.049 | 0.16 | 0.007 |
| 3% Darco G-60 | 0.637 | 0.048 | 0.024 | --- |

Percent polymer was determined by precipitating polymeric impurities from 50 ml. of the 15% aqueous SEM⁻Na⁺ with 350 ml. of acetone. The flocculant precipitate was removed by filtration on a tared fine sintered glass crucible and washed with 90/10 acetone/water (by vol.) to remove all monomer. The crucible containing polymer was dried to constant weight at 90° C. under vacuum.

Optical density at 3900 A. was measured in a 5 mm. cuvette using a Lumitron Model 402E Colorimeter, filter M390. Aqueous SEM⁻Na⁺, 15%, which had been prepared with diphenyl phenylene diamine (DPPD) as a polymerization inhibitor had a maximum optical density at 3900 A. Therefore, the optical density at 3900 A., $D_{390}$, was chosen as a measure of the concentration of colored impurities.

Hydrous $ZrO(OH)_2$ was prepared by neutralizing a solution of 10.0 g. $ZrOCl_2 \cdot 8H_2O$ in 300 ml. of deionizing water to pH 7 with 5 N NaOH solution. The white flocculant precipitate was filtered and washed on a medium sintered glass funnel until the filtrate was free of Cl⁻. The wet precipitate weighed 37.2 g. and contained 10.8% solids. Filter-cel was optionally added to the $ZrOCl_2$ solution before neutralization to aid filtration and washing but it was not essential. Ratios of between 3.33 to 10.0 g. filter-cel to 1 g. $ZrOCl_2 \cdot 8H_2O$ were equivalent in activity to $ZrO(OH)_2$ of itself, but a ratio of 100 to 1 apparently decreased the capacity of $ZrO(OH)_2$ for polymer adsorption.

Figure 2:
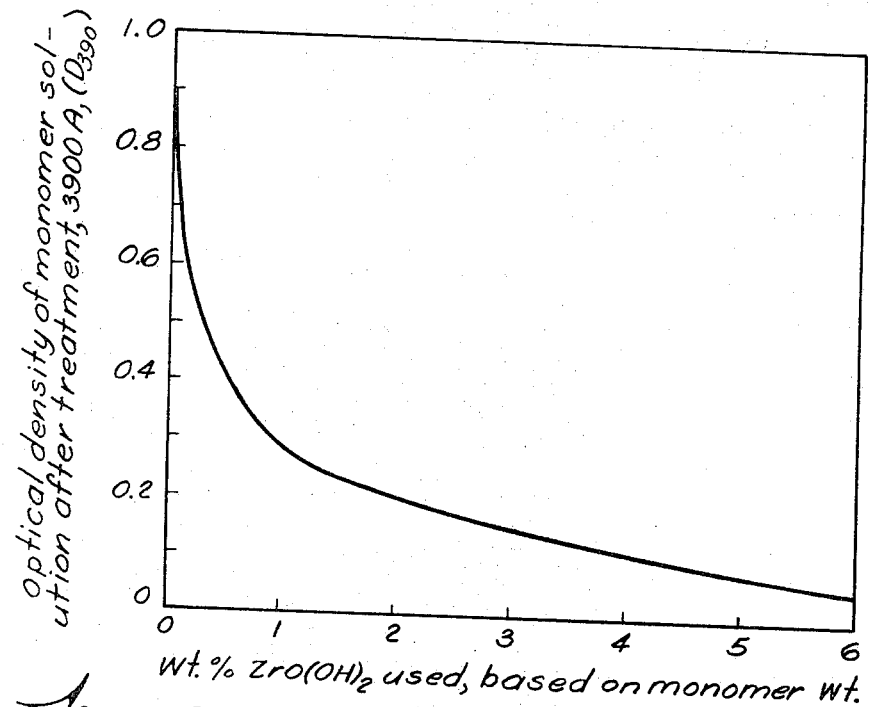

The polymer adsorption capacity of $ZrO(OH)_2$ in a 15% SEM⁻Na⁺ solution is graphically illustrated in FIGURE 1, in which the concentration of polymer remaining in solution is plotted against the amount of $ZrO(OH)_2$ used. The adsorption capacity of the $Zr(OH)_2$ for colored impurities is shown in FIGURE 2 in which optical density, $D_{390}$, is plotted against the amount of $ZrO(OH)_2$ used. Essentially all of the acetone precipitatable polymer was removed by 2% $ZrO(OH)_2$, however, additional low molecular weight colored impurities were removed with up to 6% $ZrO(OH)_2$ as indicated by the slope of the optical density versus $ZrO(OH)_2$ line in FIGURE 2.

The activated charcoal was a more efficient adsorbent for low molecular weight impurities. Table VI lists results of treatment of a 15% SEM⁻Na⁺ solution, from which polymeric impurities had been removed by treatment with 4.3% $ZrO(OH)_2$, with various amounts of Darco G-60 powder.

TABLE VI

| Percent Darco G-60 based on monomer weight | Unsaturation, mmoles/ml. | Carboxylic acid, mmoles/ml. | Optical density, $D_{390}$ |
|---|---|---|---|
| 0 | 0.642 | 0.049 | 0.156 |
| 1 | 0.644 | 0.048 | 0.042 |
| 3 | 0.637 | 0.048 | 0.024 |
| 5 | 0.636 | 0.047 | 0.018 |
| 10 | 0.628 | 0.041 | 0.020 |

EXAMPLE 2

Aqueous crude SEM⁻Na⁺, 15%, containing 0.2% DPPD and pH adjusted to 4 was treated with hydrous $Al(OH)_3$ in the same manner as described in Example 1 for treatment with hydrous $ZrO(OH)_2$. Removal of polymeric impurities was excellent.

Hydrous $Al(OH)_3$ was prepared by neutralizing $Al_2(SO_4)_3$ solution to pH 7 with 5 N NaOH solution. The flocculant precipitate contained 20.0% solids after filtration and washing with water.

EXAMPLE 3

Aqueous crude SEM⁻Na⁺, 15% (0.2% DPPD) at pH 3 was treated with 0.5% polyethyleneimine (M.W. >5000) in the form of a 1% aqueous solution. The precipitate formed was separated by filtration. Removal of polymeric sulfonate impurity from the monomer was achieved, providing a relatively pure monomer solution.

EXAMPLE 4

Figure 3:
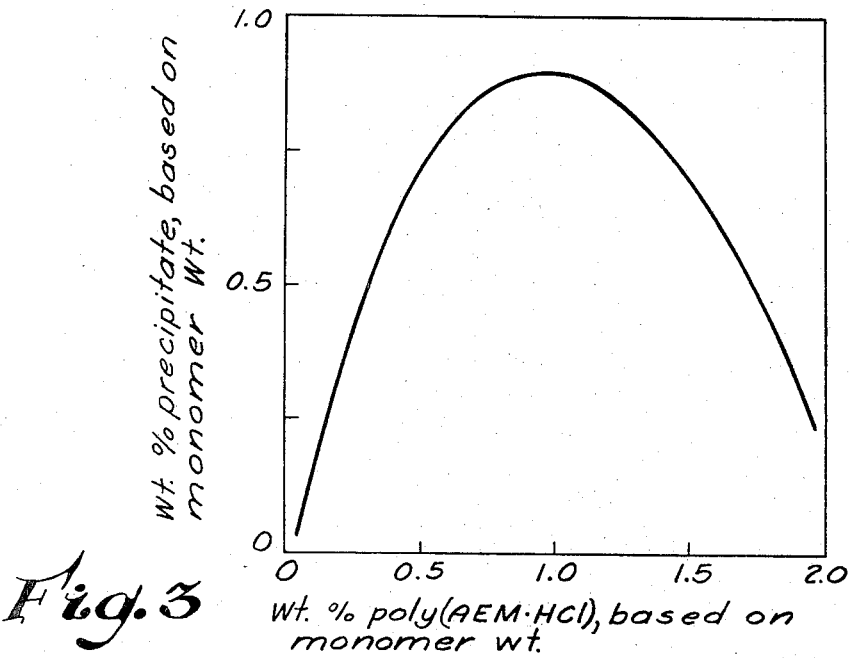

Aqueous crude SEM⁻Na⁺, 15%, containing 0.2% diphenyl phenylenediamine was treated with water soluble poly(aminoethyl methacrylate·HCl), M.W. >50,000 (poly AEM·HCl) in the form of an 0.54% aqueous solution. The amount of dark sticky precipitate separated by filtration is plotted as a function of poly AEM·HCl concentration in FIGURE 3. The maximum amount of polymeric precipitate was removed with 1% poly AEM·HCl, however, the greatest incremental increase of precipitate weight compared to poly AEM·HCl added was with about 0.5% poly AEM·HCl.

Figure 4:
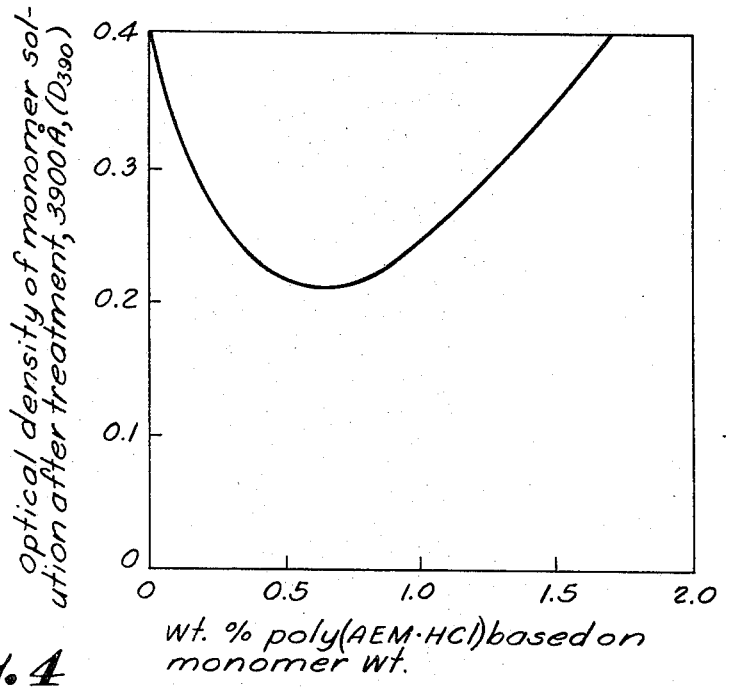

The efficiency of color removal is shown in FIGURE 4 in which optical density at 3900 A. is plotted as a function of poly SEM·HCl concentration. The color of SEM⁻Na⁺ solution was reduced to a minimum by 0.5% poly AEM·HCl.

The graphs indicate an optimum amount of soluble cationic polymer, such as poly AEM·HCl, may be required to effect maximum separation of polymeric impurities from SEM⁻Na⁺ and other ethylenically unsaturated sulfonated monomer solutions. Formation of a filterable precipitate may occur best near the equivalence point where the charge on the aggregate of polymeric impurity and poly AEM·HCl (and other cationic adsorbents) will be a function of the concentration of polymeric impurities in the SEM⁻Na⁺ (and other sulfonated monomers).

Colored impurities in SEM⁻Na⁺ remaining after treatment with 0.4% poly AEM·HCl were removed by passing the solution through a granular carbon (20–40 mesh Darco G-60) column. The resulting solution was essentially colorless, optical density 0.004 at 3900 A. The SEM⁻Na⁺ purified by above procedure did not polymerize when heated at 60° C. for 21 hours indicating the absence of peroxidic impurities.

Similar excellent results to the foregoing are obtained when the method of the invention is employed to purify ethylene sulfonic acid, styrene sulfonic acid and other ethylenically unsaturated sulfonated monomers and when other of the cationic adsorbents are used.

It is to be understood that the invention is not to be limited by the foregoing specifically delineated embodiments, but rather, it is to be interpreted by the scope of the hereto appended claims.

We claim:
1. A method for purifying a polymerizable ethylenically unsaturated sulfonated monomer of structural formula selected from the group consisting of

(I)
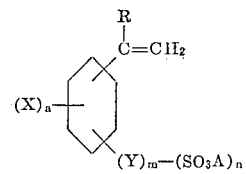

wherein R is selected from the group consisting of hydrogen, and methyl; X is individually selected from the group consisting of hydrogen, chlorine, bromine, and alkyl radicals containing from 1 to 8 carbon atoms; Y is selected from the group consisting of bivalent and trivalent hydrocarbon radicals containing 1 to 4 carbon atoms; A is selected from the group consisting of hydrogen, alkali metals, and alkaline earths Ca, Ba, Sr or the transisition metals Zn, Cu, Ni, Co, Fe, Mn, Cr, V, Ti; $a$ is an integer from 1 to 4; $m$ has a numerical value in whole units of 0 to 1; $n$ is an integer from 1 to 2;

(II) $\quad CH_2=CZ-(Y)_m-(SO_3A)_n$ wherein Z is selected from the group consisting of hydrogen, chlorine, bromine, carboxyl radicals, aryl radicals containing from 6 to about 12 carbon atoms, and alkyl radicals containing from 1 to 8 carbon atoms, and Y, A, $m$ and $n$ are as defined above for monomer (I);

(III) $\quad CH_2=CR-CO-Q-Y-(SO_3A)_n$ wherein Q is selected from the group consisting of oxygen (—O—) and amidenitrogen (—NR—); and R, Y, A, and $n$ are as defined above for monomer (I), comprising the sequential steps of (a) mixing with and dispersing throughout an aqueous solution of a mixture of said polymerizable ethylenically unsaturated sulfonated monomer and polymers of the monomer a cationic adsorbent having a plurality of cationic groups selected from the group consisting of (1) water insoluble cationic colloidally dispersible hydrous metal oxides from the group consisting of hydrous zirconium oxide, hydrous aluminum oxide, and hydrous iron (III) oxide, (2) colloidally dispersible emulsions of a water-soluble salt of a mono-hydric amino alcohol ester of an α-methylene mono-carboxylic acid from the group consisting of 2-aminoethyl acrylate hydrochloride, 3-aminopropyl acrylate, hydrochloride 2-aminoethyl methylacrylate hydrochloride, 2-aminoethyl α-butylacrylate hydrochloride, and 2-aminobutyl α-ethylacrylate hydrochloride copolymerized with a water-insoluble ethylenically unsaturated monomer from the group consisting of styrene, α-methyl styrene, ar-methyl styrene, ar-ethyl styrene, cyano styrene, ethyl acrylate, butyl acrylate, hexyl acrylate, and methyl methacrylate and (3) water-soluble polycationic electrolytes from the group consisting of the polyalkyleneimines, poly-2-aminoethyl methacrylate hydrochloride, poly-N,N-dimethyl-2-aminoethyl methacrylate hydrochloride, and starch containing chemically bound dimethyl aminoethyl ether groups, and which is reactive with the anionic groups of said polymer;

(b) maintaining the dispersion for a time sufficient to cause said polymer to combine with said cationic adsorbent and form a separate phase from said aqueous solution of monomer;

(c) isolating said separate phase from said aqueous solution of monomer;

(d) contacting said isolated aqueous phase with a finely divided activated carbon; and, subsequently, (e) isolating said aqueous phase from said activated carbon.

2. The method of claim 1, wherein said cationic adsorbent is hydrous zirconium oxide.

3. The method of claim 1, wherein said cationic adsorbent is a polyalkyleneimine.

4. The method of claim 1, wherein said sulfonated monomer is sodium styrene sulfonate.

5. The method of claim 1, wherein said sulfonated monomer is sulfoethylmethacrylate.

6. The method of claim 1, wherein said sulfonated monomer is sulfoethylacrylate.

7. The method of claim 1, wherein the amount of said cationic adsorbent that is dispersed throughout said aqueous solution is between about 0.5 and about 10 weight percent, based on monomer weight.

References Cited
UNITED STATES PATENTS

| | | | |
|---|---|---|---|
| 3,024,221 | 3/1962 | Le Fevre | 260—486 XR |
| 3,109,025 | 10/1963 | Olenberg | 260—537 |
| 3,228,973 | 1/1966 | O'Connor | 260—486 |
| 3,247,242 | 4/1966 | McGarvey et al. | 260—486 |
| 3,297,734 | 1/1967 | Armen et al. | 260—429.9 |
| 2,693,488 | 11/1954 | Sexton | 260—513 |

LORRAINE A. WEINBERGER, *Primary Examiner.*

A. P. HALLUIN, *Assistant Examiner.*

U.S. Cl. X.R.

260—79.3, 89.5, 89.7, 429, 429.5, 429.9, 438.1, 438.5, 439, 505, 513; 252—353